(12) United States Patent
Wu et al.

(10) Patent No.: US 8,864,921 B2
(45) Date of Patent: Oct. 21, 2014

(54) METHOD FOR ANNEALING A STRIP OF STEEL HAVING A VARIABLE THICKNESS IN LENGTH DIRECTION

(75) Inventors: Hai Wu, Haarlem (NL); Camile Wilbert José Hol, Heemskerk (NL); Pieter Jacob Van Popta, Beverwijk (NL); Willem Cornelis Verloop, Hoofddorp (NL)

(73) Assignee: Tata Steel Ijmuiden B.V., Ijmuiden (NL)

( * ) Notice: Subject to any disclaimer, the term of this patent is extended or adjusted under 35 U.S.C. 154(b) by 876 days.

(21) Appl. No.: 12/668,791

(22) PCT Filed: Mar. 19, 2008

(86) PCT No.: PCT/EP2008/053324
§ 371 (c)(1),
(2), (4) Date: Jun. 28, 2010

(87) PCT Pub. No.: WO2008/104610
PCT Pub. Date: Sep. 4, 2008

(65) Prior Publication Data
US 2010/0258216 A1   Oct. 14, 2010

(30) Foreign Application Priority Data

Jul. 19, 2007   (EP) .................... 07014174

(51) Int. Cl.
*C21D 8/02*   (2006.01)
*C23C 2/28*   (2006.01)
*C23C 2/06*   (2006.01)

(52) U.S. Cl.
USPC ........... 148/533; 148/579; 148/661; 148/567; 148/645

(58) Field of Classification Search
USPC .......................... 148/533, 645, 579, 661, 567
See application file for complete search history.

(56) References Cited

U.S. PATENT DOCUMENTS

| | | | |
|---|---|---|---|
| 4,239,483 A | 12/1980 | Iida et al. | |
| 4,440,583 A | 4/1984 | Ikegami et al. | |
| 4,985,090 A | 1/1991 | Van Perlstein et al. | |
| 5,472,528 A | 12/1995 | Boyer | |
| 5,512,110 A * | 4/1996 | Yoshitomi et al. | 148/113 |
| 6,296,805 B1 | 10/2001 | Laurent et al. | |
| 2001/0042393 A1 | 11/2001 | Kefferstein et al. | |

(Continued)

FOREIGN PATENT DOCUMENTS

| | | |
|---|---|---|
| EP | 0 086 265 A1 | 8/1983 |
| EP | 0329220 A1 | 8/1989 |

(Continued)

OTHER PUBLICATIONS

Translation of JP 60002634, 1985.*

(Continued)

*Primary Examiner* — Rebecca Lee
(74) *Attorney, Agent, or Firm* — Novak Druce Connolly Bove + Quigg LLP

(57) ABSTRACT

A method for annealing a strip of steel having a variable thickness in its length direction with at least thicker and thinner sections, wherein the strip has been cold rolled to form the thicker and thinner sections, one thicker and one thinner section having a length of at most a few meter. The annealing is performed by continuous annealing.

21 Claims, 2 Drawing Sheets

(56) References Cited

U.S. PATENT DOCUMENTS

| | | | |
|---|---|---|---|
| 2004/0050464 | A1 | 3/2004 | Engl et al. |
| 2004/0163439 | A1 | 8/2004 | Arns et al. |
| 2004/0197598 | A1 | 10/2004 | Imai et al. |
| 2004/0255633 | A1 | 12/2004 | Hauger |
| 2006/0130940 | A1* | 6/2006 | Kollaritsch et al. ........... 148/518 |
| 2006/0134452 | A1* | 6/2006 | Suzaki et al. ................. 428/653 |
| 2007/0000117 | A1 | 1/2007 | Brandstatter et al. |
| 2007/0035118 | A1 | 2/2007 | Ni et al. |
| 2007/0256808 | A1 | 11/2007 | Fleischanderl et al. |
| 2007/0271978 | A1 | 11/2007 | Brandstatter et al. |
| 2008/0196800 | A1 | 8/2008 | Beenken et al. |
| 2008/0283154 | A1* | 11/2008 | Taniguchi et al. ............ 148/240 |
| 2008/0308194 | A1 | 12/2008 | Corquillet et al. |
| 2009/0025836 | A1 | 1/2009 | Bello et al. |
| 2010/0026048 | A1 | 2/2010 | Vlot et al. |
| 2010/0282373 | A1 | 11/2010 | Van Tol et al. |
| 2010/0304174 | A1 | 12/2010 | Wu et al. |
| 2011/0132052 | A1 | 6/2011 | Faderl |

FOREIGN PATENT DOCUMENTS

| | | | | |
|---|---|---|---|---|
| EP | 1 013 785 | A1 | 6/2000 | |
| EP | 1013785 | A1 | 6/2000 | |
| EP | 1 571 229 | A1 | 9/2005 | |
| EP | 1 621 645 | A1 | 2/2006 | |
| EP | 1621645 | A | 2/2006 | |
| EP | 1767659 | A1 | 3/2007 | |
| EP | 1980638 | A1 | 10/2008 | |
| EP | 1989638 | A1 | 10/2008 | |
| GB | 706681 | | 4/1954 | |
| GB | 2110248 | A | 6/1983 | |
| JP | 60-2634 | | 1/1985 | |
| JP | S60-61106 | A | 4/1985 | |
| JP | 60-169525 | | 9/1985 | |
| JP | 02-258933 | A | 10/1990 | |
| JP | 02277724 | A | 11/1990 | |
| JP | 03-047924 | A | 2/1991 | |
| JP | 6-136451 | | 5/1994 | |
| JP | H07-97635 | A | 4/1995 | |
| JP | H11-061277 | A | 3/1999 | |
| JP | H11-147102 | A | 6/1999 | |
| JP | 2000-256753 | A | 9/2000 | |
| JP | 2001-11541 | A | 1/2001 | |
| JP | 2002285311 | A | 10/2002 | |
| JP | 2002-331317 | A | 11/2002 | |
| JP | 2005-120471 | A | 5/2005 | |
| SU | 863681 | | 9/1981 | |
| WO | WO 2005068676 | A1 * | 7/2005 | ............ C22C 38/00 |
| WO | 2006128821 | A1 | 12/2006 | |
| WO | 2007/048883 | | 5/2007 | |
| WO | 2007-086158 | A1 | 8/2007 | |
| WO | 2008/068352 | A3 | 6/2008 | |
| WO | 2008113426 | A2 | 9/2008 | |
| WO | 2009/021743 | A1 | 2/2009 | |

OTHER PUBLICATIONS

Translation of JP 60169525, 1985.*
Final Office Action of Jun. 1, 2012 for U.S. Appl No. 12/525,136 to Vlot et al.
Non-Final Office Action of Jan. 13, 2012 for U.S. Appl No. 12/525,136 to Vlot et al.
Bian, et al., "Development of Hot Dip Galvanized Steel Strip and its Application in Automobile Industry", Journal of Iron and Steel Research Int., vol. 13, No. 1, (May 1, 2006).
Lenze, et al., "Herstellung von Karosseriebauteilen aus warmumgeformten hochfesten Stahlwerkstoffe", EFB Tagungsband, Europaeische Forschungesellschaft Fuer Blechverarbeitung, DE. vol. 25 (Jan. 1, 2005) with English language Abstract.
Mubea—The Technology Company, website printout, retrieved from Internet Jun. 10, 2009 URL: http:/www.mubea.com/english/produkte_Kaross.html.
U.S. Appl. No. 12/669,314 to Van Tolet al. US National Stage of PCT published application WO 2009/021743, international filing date Aug. 14, 2008.
U.S. Appl. No. 12/668,855 to Wu et al. US National Stage of PCT published application WO 2008/068352, international filing date Mar. 19, 2008.
Pradhan, R., "Continuous Annealing of Steel", ASM Handbook, 1991, ASM International, vol. 4., p. 1-27.
Non-Final Office Action dated Oct. 3, 2012 to WU from U.S. Appl No. 12/668,855, filed Jun. 22, 2010.
Non-Final Office Action dated Nov. 21, 2012 from U.S. Appl. No. 12/669,314 to van Tol, filed Jul. 19, 2010.
Apr. 11, 2013 Office Action, U.S. Appl. No. 12/669,314 to Ron Van Tol et al, filed Jul. 19, 2010.
"High-Tech Tandem Cold Mills Cold rolling technology for all requirements", SMS SIEMAG, pp. 1-36 (2010 or later).
European Standard, Final Draft prEN 10336, "Continuously hot-dip coated and electrolytically coated strip and sheet of multiphase steels for cold forming—Technical delivery condition", pp. 1-25 (Dec. 2006).
www.asmet.at/forum2006, Forum fur Metallurgie and Werkstofftechnik (Forum for Metallurgy and Materials Engineering), Tagungsunterlagen (Meeting Documents), Leoben (May 22-24, 2006)(with Machine Translation).
European Standard, Den En 10027-1, "Designation systems for steels", Aug. 2005, pp. 1-25.
3d Party Observations of Jul. 31, 2012, against EP patent app. No. 08785556.5 to Tata Steel Umuiden BV.
EPO Communication of Jan. 3, 2013, against EP patent app. No. 08785556.5 to Tata Steel IJmuiden BV.
Office action for JP Patent App. No. 2010-516433 to Tata Steel Umuiden BV, mailed Jun. 11, 2013, with translation.
Non-Final Office Action dated Sep. 6, 2013 from U.S. Appl. No. 12/525,136 to Margot Julia Vlot, et al filed Sep. 24, 2009.
Final Office action of Jun. 3, 2013 from U.S. Appl. No. 12/668,855 to WU.

* cited by examiner

METHOD FOR ANNEALING A STRIP OF STEEL HAVING A VARIABLE THICKNESS IN LENGTH DIRECTION

CROSS-REFERENCE TO RELATED APPLICATIONS

This application is a §371 National Stage Application of International Application No. PCT/EP2008/053324, filed on 19 Mar. 2008, claiming the priority of European Patent Application No. 07014174.2 filed on 19 Jul. 2007.

The invention relates to a method for annealing a strip of steel having a variable thickness in its length direction with at least thicker and thinner sections, wherein the strip has been cold rolled to form the thicker and thinner sections, one thicker and one thinner section having a length of at most a few meters.

A strip of steel having a variable thickness in its length direction is often made such that the strip has a repetitive thickness variation, wherein a thicker section of the strip is followed by a thinner section which is thereafter followed by a thicker section, and this is repeated over the length of the strip. Often the thinner sections all have approximately the same length, and so have the thicker sections. One thicker and one thinner section have a length of at most a few meters. One strip can have at least a few hundred thicker and thinner sections. The thicker and thinner sections have a thickness between a few tenths of a millimeter and a few millimeters. For special purposes, the strip is rolled into three or more different thicknesses which repeat along the length of the strip. Due to the fact that the strip of steel has been cold rolled, between the thicker and thinner sections a transitional section will be formed in which the thickness of the strip gradually changes from the thickness of one section to the thickness of the following section. The length of this transitional section is determined by the thickness change between the sections, the rolling speed and the speed with which the cold rolling mill can change the distance between the rolls, to mention the most important parameters. Usually, the length of the transitional section is of the same order as the length of the thicker and thinner sections or even shorter. The width of the strip can be from a few decimeters up to about two meters. The strip can be slit into two or more strips having a reduced width, but this is not always required. Such a strip is cut into pieces which are called tailor rolled blanks (TRBs), for instance for the automotive industry. The blanks thus have at least two different thicknesses over their lengths, as required for the purpose and place they are used in.

During the rolling of the strip of steel the thickness is considerably reduced in the thinner portions. This results in a hardening of the steel, such that the rolled strip cannot be used directly. The steel strip has to be annealed to release the stresses in the strip and/or to recrystallise the strip.

Annealing of a steel strip without thickness variations can be performed either by batch annealing or by continuous annealing. Annealing of strip having a variable thickness in its length direction, however, is performed only by batch annealing, so as to provide the same temperature to both the thinner and the thicker sections. Batch annealing though is more expensive than continuous annealing, and it usually has a somewhat deteriorating effect on the strength of the steel. Due to the slow heating and cooling rate experienced in the case of batch annealing it is not attractive for all steel types, especially for steel types having a higher strength.

It is an object of the invention to provide an improved annealing method for a strip of steel having a variable thickness in its length direction.

It is another object of the invention to provide an annealing method for a strip of steel having a variable thickness in its length direction that is more cost-efficient than batch annealing.

It is yet another object of the invention to provide an annealing method for a strip of steel that is usable for many, if not all steel types.

It is a further object of the invention to provide an annealing method for a strip of steel that provides a higher strength as compared to batch annealing.

It is still another object of the invention to provide an annealing method for a strip of steel that improves the quality of the steel as compared to batch annealing.

According to the invention at least one of these objects is reached using a method for annealing a strip of steel having a variable thickness in its length direction with at least thicker sections and thinner sections, wherein the strip has been cold rolled to form the thicker and thinner sections, one thicker and one thinner section having a length of at most a few meters, wherein the annealing is performed by continuous annealing.

The inventors of the present invention have observed that, contrary to the well-known batch annealing which is the only method of annealing used according to the state of the art, it is nevertheless possible to continuous anneal a strip of steel having a variable thickness in length direction. Continuous annealing has the advantage that it is a faster process and provides new and better TRBs. TRBs produced using continuous annealing have better mechanical properties than TRBs produced using batch annealing having the same composition and rolling history, such as a higher mechanical strength.

According to a preferred embodiment, during the forming of the strip having a variable thickness in its length direction the thickness reduction after hot rolling of the steel strip is less than 15% for the thicker sections and more than 15% for the thinner sections, and the heating of the strip during the annealing is performed at a velocity such that the temperature of the thicker sections remains under the recrystallisation temperature of the thicker sections and the temperature of the thinner sections is raised to a temperature above the recrystallisation temperature of the thinner sections. As a result, after the annealing the thinner sections will be recrystallised and the thicker sections will not have recrystallised, resulting in more uniform properties for the strip.

Preferably, the cooling rate after recrystallisation during continuous annealing of the steel strip is between 5 and 150° C./s so as to produce high-strength steels such as DP, TRIP and multi-phase high-strength steels. Due to the high cooling rates in the continuous annealing process, usually between 5 and 150° C./s, martensite, bainite, retained martensite and other forms of transformation products can be formed from austenite which are necessary for the forming of DP, TRIP and multi-phase high-strength steels, which is not possible with batch annealing due to the slow cooling rate thereof.

To provide certain TRB steel types, some measures have to be taken such that the temperature of the thicker and thinner sections of the strip is brought to a required temperature, dependant on the type of steel used, but according to the invention these measures can be taken.

According to a preferred embodiment, the maximum temperature and/or soaking temperature of the strip of steel during the annealing is kept within a range with a width of 100° C., preferably within a range with a width of 50° C., more preferably within a range with a width of 25° C. At least for a steel strip, annealing with a maximum and/or soaking temperature within a range with a width of 100° C. provides an acceptable quality for the steel strip, which improves when the range has a width of 50° C., and improves further when the range has a width of 25° C.

Preferably, thicker and thinner sections of the strip of steel are selectively heated to anneal the strip of steel. By selective heating the thicker and the thinner sections of the strip receive a different amount of heat.

According to a preferred embodiment, thinner sections of the strip of steel receive less heat during the annealing than thicker sections of the strip of steel. The thicker sections of the strip have a higher heat capacity than the thinner sections because they have a higher mass per square cm, so the thicker sections require more heat than the thinner sections to reach approximately the same temperature.

Preferably the selective heating of the strip of steel is performed during and/or after the heat-up phase of conventional annealing. During conventional continuous annealing, each length of the strip will get approximately the same heat energy, usually in a direct fired furnace, so the thicker sections reach a lower temperature than the thinner sections since they have a higher heat capacity. It is very efficient to selectively heat the thicker sections after the conventional annealing so as to increase the temperature of the thicker sections. However, the selective heating can also take place in an earlier stage, but in that case is less effective.

According to a preferred embodiment the selective heating is performed using induction heating. Induction heating is a very rapid and effective way of heating, which makes it possible to heat especially thicker sections of steel, whereas thinner sections are heated only slightly.

Preferably the induction heating uses such a frequency that the thicker sections are heated to a selected temperature. By choosing the frequency such that that the induction energy is absorbed in the thicker sections, and is adapted to the specific thickness of those sections of the strip that is annealed, almost all the induction energy is absorbed by the thicker sections and the thinner sections do almost not absorb the induction energy.

Preferably, the induction heating is performed with a power density of 1000 kW/m$^2$ or more. With this power density it is possible to perform the continuous annealing with a speed that makes the method economically viable.

For most steel types and strip thicknesses the induction heating is preferably performed with a frequency between 5 and 50 kHz, preferably between 10 and 30 kHz. These frequencies allow a good absorption of the induction energy in the thicker sections and a low absorption in the thinner sections.

The method described above is suitable to produce high strength steels such as DP, TRIP and multi-phase high-strength steels, since both the thicker and thinner sections have to be heated fast, but the thinner sections should not reach a too high temperature.

According to a preferred embodiment, the strip of steel is hot dip galvanised after the continuous annealing. Coating with a zinc layer provides a good corrosion resistance to especially a steel strip, and hot dip galvanising can be performed directly after the continuous annealing on the same continuous strip.

According to another preferred embodiment, the strip of steel is temper rolled after the continuous annealing. Temper rolling provides a reduction of the yielding phenomenon, a better surface roughness and an improvement of the shape of the strip.

The method according to the invention will be elucidated referring to the figures and examples below.

Figure 1:
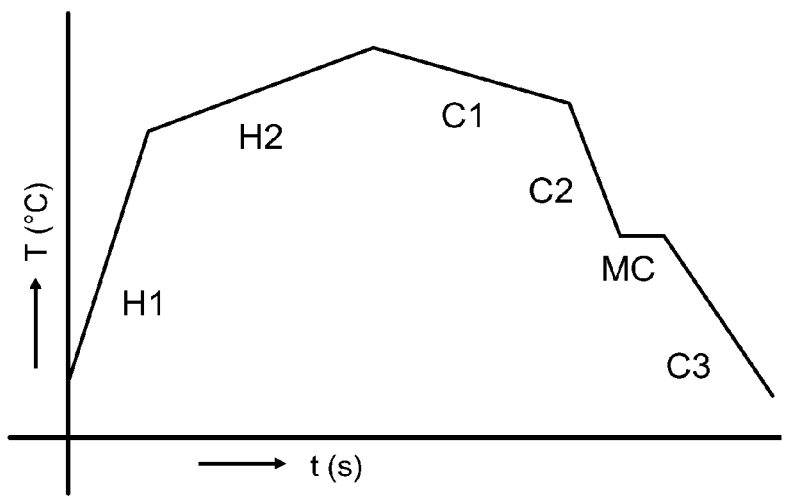
FIG. 1 shows a schematic representation of a continuous annealing time-temperature cycle.
Figure 2:
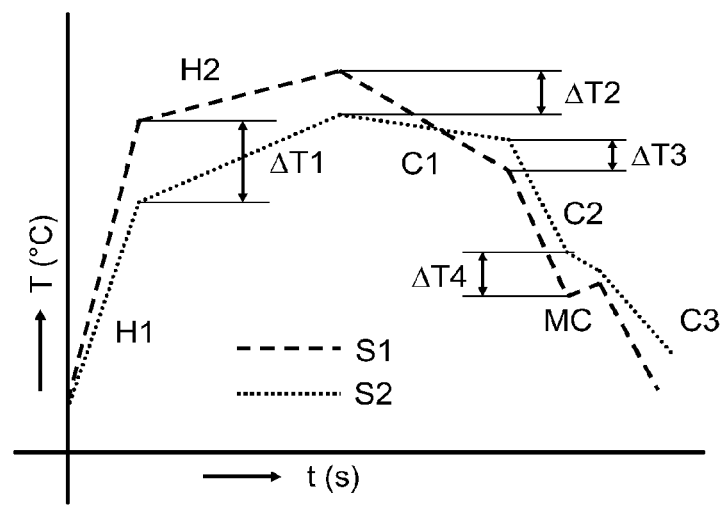
FIG. 2 shows a schematic representation of the differences in temperature, heating and cooling rates between thinner and thicker sections of the TRB.
Figure 3:
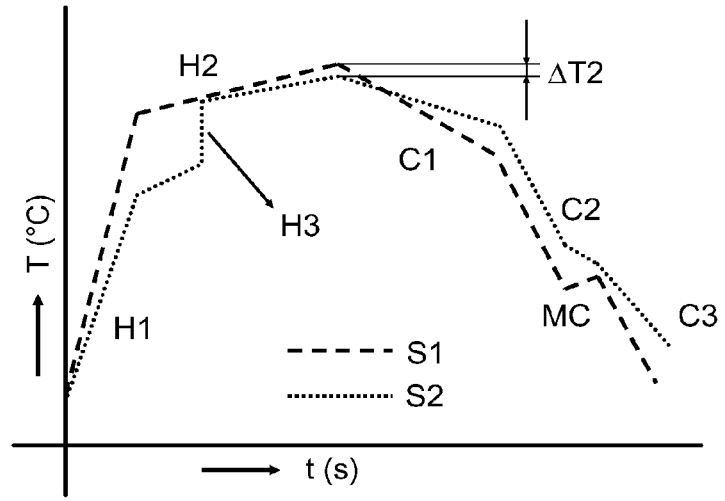
FIG. 3 shows a schematic representation of the use of selective heating to adjust the differences in temperature, heating and cooling rates between thinner and thicker sections of the TRB.

In the FIGS. 1, 2 and 3 the temperature T is presented along the vertical axis and time t along the horizontal axis.

In FIG. 1 a typical continuous annealing time-temperature curve is presented. The process in a continuous annealing line for steel strip often consists of a sequential of different heating and cooling sections. As shown schematically in FIG. 1 normally a fast heating section (H1) is followed by a slow heating section (H2), after which the strip reaches it maximum temperature. This maximum temperature is normally higher than the recrystallisation temperature to ensure complete recrystallisation of the microstructure of the steel. In the case of high strength steels such as DP, TRIP and multi-phase high-strength steels the maximum temperature must be higher than 720° C. to bring the material in the two-phase region of austenite and ferrite. The presence of austenite, which can transform into martensite, bainite and/or retained austenite on subsequent cooling, is a prerequisite to produce high strength steels such as DP, TRIP and multi phase high strength steels. After realising the maximum temperature the strip can be cooled down, which is often done in several cooling sections. In FIG. 1 a slow cooling section (C1), a fast cooling section (C2) and a final cooling section (C3) are presented. The cooling of the strip can be interrupted for applying a metal coating process (MC), e.g. hot dip galvanising. After cooling of the strip temper rolling and/or other surface and/or shape modifications can be performed in line. The whole process normally takes less than 1000 seconds to complete.

In FIG. 2 the effect of continuous annealing on TRB is illustrated. The sections with variation in thickness will show a difference in heating and cooling rates, and as a result will follow different time-temperature cycles. The line S1 indicates the time-temperature cycle for the thinner sections of the TRB, and the line S2 indicates the time-temperature cycle for the thicker sections of the TRB. Obviously the exact time-temperature profile depends on many parameters, such as the thickness profile of the strip, line speed, width of the strip, heating and cooling capacity of individual sections in the continuous annealing line. Noteworthy in FIG. 2 is the relatively large difference in temperature at the end of the fast heating section ($\Delta T1$). The difference $\Delta T1$ can in some cases reach values of more than 100° C.

The difference in temperature at maximum temperature ($\Delta T2$) is a critical parameter for successfully producing continuous annealed TRB. If $\Delta T2$ becomes too big the mechanical properties of the thicker and/or thinner sections become unstable. If the temperature of the thicker sections becomes too low than the material is not fully recrystallised and the mechanical properties, especially the elongation, are not fully developed and extremely sensitive to small fluctuations of the maximum temperature. On the other hand, if the temperature of the thinner sections becomes too high, higher than 800° C., the mechanical properties of especially high strength steels will deteriorate. The deterioration is caused by the fact that the grain size will increase with the maximum temperature, because the fine grain size after cold rolling and recrystallisation will be eliminated by transformation. With higher temperatures, above 720° C., more austenite is formed and a larger fraction of the microstructure will after continuous annealing consist of transformed material instead of recrystallised material. This effect becomes especially detrimental above 800° C. because of the increase in austenite fraction. In the case of high strength steels such as DP, TRIP and multiphase high-strength steels a large temperature difference ($\Delta T2$) is undesirable because the mechanical properties are directly related to the maximum temperature, i.e. the amount of austenite before cooling.

The difference in temperature between the thicker en thinner sections of the TRB during cooling ($\Delta T3$ or $\Delta T4$) is also of importance. Especially if a metal coating process like hot dip galvanising is applied. When the strip entering the zinc bath is too cold, the zinc will not make good contact with the strip surface and problems with zinc adherence and surface quality will arise. The zinc only starts to solidify below a temperature of 420° C. When the temperature of the strip entering the zinc bath is too high, the amount of iron dissolving in the zinc increases and thus the amount of metallic dross formation in the zinc bath. This can lead to a bad surface quality of the material. A high strip temperature can cause increased alloying between the zinc layer and the substrate.

According to a preferred embodiment the temperature differences between the thick en thin sections of the TRB can be reduced by selective heating. This is illustrated in FIG. 3. At some point during heating of the strip the temperature of the thicker sections is increased (H3). The temperature of the thicker sections can be increased to a temperature level reaching that of the thin section, or even above. In this way the difference in maximum temperature ($\Delta T2$) can be reduced significantly.

Hereinafter four examples of annealing tailor rolled blanks are given. The chemical composition of the four examples is given in Table 1. The mechanical properties, after both batch and continuous annealing, are given in Table 2.

TABLE 1

| | | | Chemical composition* | | | | | | |
|---|---|---|---|---|---|---|---|---|---|
| example | C | Mn | P wt-% * $10^{-3}$ | S | Si | Al | N ppm | Nb wt-% * $10^{-3}$ | V | Cr |
| 1 | 39 | 276 | 13 | 6 | 22 | 27 | 31 | 14 | | |
| 2 | 42 | 220 | 13 | 4 | 25 | 30 | 30 | | | |
| 3 | 51 | 250 | 8 | 4 | 8 | 40 | 26 | 27 | | |
| 4 | 90 | 1700 | 15 | 5 | 260 | 45 | 31 | | | 550 |

*remainder being iron and inevitable impurities

Example 1

A steel strip is formed by hot rolling. After hot rolling, a steel strip having a variable thickness in length direction is formed by cold rolling both the thicker sections and the thinner sections with a reduction of at least 15%. As a result, both the thicker and the thinner sections will recrystallise during annealing.

When continuous annealing is performed the strength of the TRB will always be higher than when batch annealing is applied. After continuous annealing the yield strength in the thick section is higher than the thin section. In case of example 1 selective heating was not applied. The line speed in the continuous line was relatively low and therefore in this case the difference in temperature between the thin and the thick section is relatively small.

Example 2

A steel strip is formed by hot rolling. After hot rolling, a steel strip having a variable thickness in length direction is formed by cold rolling the thicker sections with a reduction of less than 15%, usually approximately 5%, and by cold rolling the thinner sections with a reduction of at least 15%, usually between 20 and 50%.

This rolling type has the advantage that in the thicker sections the hot rolled yield strength is increased by a small cold rolling reduction, which improves the yield strength, which is to a large extend retained during subsequent annealing. Another advantage is that cold rolling of the thinner sections is more easy because only the thinner sections have to be reduced.

The yield strength of the continuous annealed strip in the thinner sections is 73 MPa higher than for the batch annealed product. Also the yield strength in the thicker sections is higher after continuous annealing. Producing TRB by only applying a large reduction to the thinner sections is a production route that has many economical advantages. In case of batch annealing the inhomogeneity of the mechanical properties between the thinner en thicker sections is a problem. The advantage of a high yield strength in the thicker sections, based on the mechanical properties in hot rolled condition, can not be utilised fully in case of batch annealing because the yield strength in the thinner sections will always be much lower. In case of continuous annealing the yield strength in the thinner sections will come much closer to the yield strength in the thicker sections, with as result a TRB with better and more homogeneous mechanical properties.

TABLE 2

| | | | | Mechanical properties | | | | | |
|---|---|---|---|---|---|---|---|---|---|
| Example | section | Thickness [mm] | Cold rolling reduction [%] | Annealing method | Maximum annealing temp [° C.] | Selective heating | Yield strength [MPa] | Tensile strength [MPa] | Total elongation [%] | remarks |
| 1 | Thin | 0.6 | 70 | Batch | 640 | | 310 | 395 | 35 | comparison |
| 1 | Thick | 1 | 50 | Batch | 640 | | 300 | 385 | 34 | comparison |
| 1 | Thin | 0.6 | 70 | Continuous | 767 | no | 354 | 402 | 32 | invention |
| 1 | Thick | 1 | 50 | Continuous | 745 | no | 387 | 421 | 31 | invention |
| 2 | Thin | 0.65 | 57 | Batch | 640 | | 264 | 334 | 32 | comparison |
| 2 | Thick | 1.45 | 4 | Batch | 640 | | 336 | 389 | 32 | comparison |
| 2 | Thin | 0.65 | 57 | Continuous | 777 | no | 337 | 381 | 34 | invention |
| 2 | Thick | 1.45 | 4 | Continuous | 765 | no | 386 | 427 | 29 | invention |
| 3 | Thin | 0.75 | 70 | Continuous | 840 | no | 367 | 396 | 27 | comparison |

TABLE 2-continued

| | | | Cold rolling | | Maximum | | Yield | Tensile | Total | |
| Example | section | Thickness [mm] | reduction [%] | Annealing method | annealing temp [° C.] | Selective heating | strength [MPa] | strength [MPa] | elongation [%] | remarks |
| --- | --- | --- | --- | --- | --- | --- | --- | --- | --- | --- |
| 3 | Thick | 1.6 | 35 | Continuous | 740 | no | 463 | 511 | 14 | comparison |
| 3 | Thin | 0.75 | 70 | Continuous | 825 | yes | 372 | 406 | 27 | invention |
| 3 | Thick | 1.6 | 35 | Continuous | 794 | yes | 384 | 422 | 24 | invention |
| 4 | Thin | 1.0 | 60 | Continuous | 820 | yes | 254 | 612 | 22 | invention |
| 4 | Thick | 1.8 | 25 | Continuous | 780 | yes | 296 | 635 | 24 | invention |

Also in case of example 2 selective heating was not applied. The line speed in the continuous line was relatively low and therefore in this case the difference in temperature between the thinner and the thicker section is relatively small.

Example 3

Line speed in a continuous annealing line is important economical parameter. If line speed is low than cooling devices like gas jet cooling have to be operated at minimum capacity, outside the normal operation modus, making it more difficult to control the strip temperature before hot dip galvanising. Producing TRB with a normal line speed is both for economical and practical reasons beneficial. Selective heating is an effective method to enable the producer to increase line speed and at the same time improve the mechanical properties of the TRB.

In example 3, as comparison, a high strength steel is processed with a line speed of 50 m/min. It can be seen that the temperature in the thicker sections is too low to ensure complete recrystallisation. As a result the mechanical properties are insufficient, see e.g. the low total elongation of only 14%. With selective heating it is possible increase the temperature of thicker section to above the crystallisation temperature. In this way it is possible to improve the mechanical properties of the thicker sections without raising the temperature of the thinner sections. The temperature of the thinner section is well above 800° C., raising the temperature of the thinner sections would lead to a deterioration of strength so selective heating is effective method to produce a TRB with reasonable line speed.

Example 4

In example 4 a dual phase steel is presented. Essential for producing dual phase kind of steel types is a high annealing temperature (in two phase region) and relatively high cooling rate to promote transformation from austenite to martensite, bainite and/or retained austenite. In case of dual phase steel a low line speed is a disadvantage because also the cooling rate will be slow.

As with example 3 selective heating is an effective method to be able to produce a TRB where both the thicker and the thinner sections reach a sufficient high temperature, without over-heating the thinner sections, in combination with a sufficient high line speed. Chemical composition and the mechanical properties, after continuous annealing, are given in Table 1 and Table 2. The mechanical properties are clearly in accordance with dual phase standards, i.e. ratio between tensile strength and yield strength is more than 2.

Figure 4:
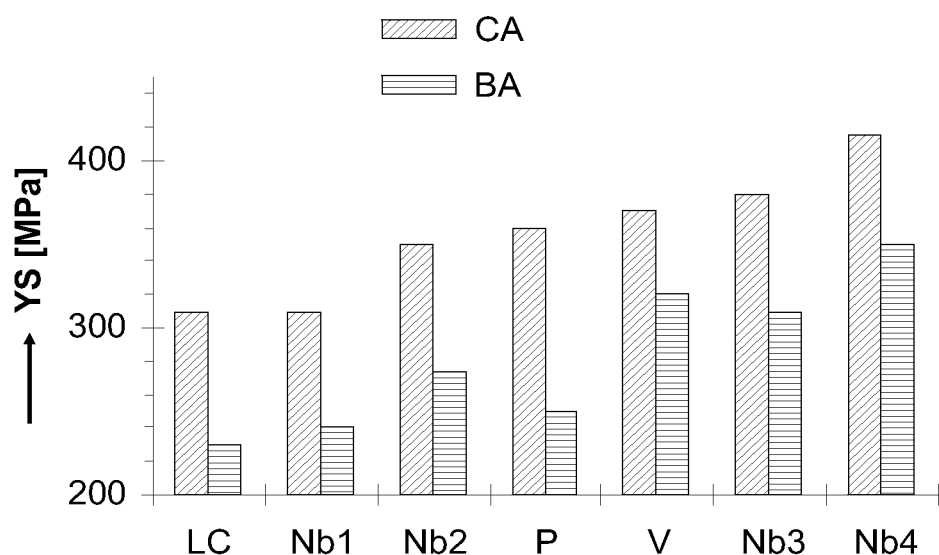
FIG. 4 shows a comparison between the yield strength measured for a number of steel types that are batch annealed and continuous annealed.

FIG. 4 shows a comparison between the batch annealing and the continuous annealing for a number of low carbon steel types, of which the composition is given in table 3. Yield Strength (YS) is given on the vertical axis, on the horizontal axis the different steel types are indicated. Such steel types are normal steel types that are produced and on the market. From FIG. 4 it is clear that the yield strength of continuous annealed steel is significantly higher than the yield strength of the same steel types that are batch annealed. Such improved yield strengths are also reached in the thinner sections of a strip of steel having a variable thickness when it is continuous annealed instead of batch annealed, as elucidated in the examples above.

The elements indicated in table 3 that are present below a certain amount are inevitable impurities.

TABLE 3

Typical composition (in wt %) of different steel types

| Steel type | C | Mn | Si | P | Nb | V |
| --- | --- | --- | --- | --- | --- | --- |
| LC | 0.045 | 0.22 | <0.01 | <0.01 | <0.002 | <0.002 |
| Nb1 | 0.045 | 0.25 | <0.01 | <0.01 | 0.009 | <0.002 |
| Nb2 | 0.06 | 0.25 | <0.01 | <0.01 | 0.017 | <0.002 |
| P | 0.06 | 0.5 | <0.01 | 0.085 | <0.002 | <0.002 |
| V | 0.045 | 0.8 | <0.01 | <0.01 | 0.013 | 0.04 |
| Nb3 | 0.07 | 0.5 | <0.01 | <0.01 | 0.026 | <0.002 |
| Nb4 | 0.075 | 1 | 0.3 | <0.01 | 0.03 | <0.002 |

The invention claimed is:

1. A method comprising:
   annealing a strip of steel,
   the strip of steel having a variable thickness in its length direction with at least thicker sections having a length of at most two meters and thinner sections having a length of at most two meters, such that the strip has a repetitive thickness variation, wherein the strip has been cold rolled to form the thicker and thinner sections,
   wherein the maximum temperature and/or the soaking temperature of the strip of steel during the annealing is kept within a range with a width of 100° C.,
   wherein thicker and thinner sections of the strip of steel are selectively heated to anneal the strip of steel and recrystallize the thinner sections,
   wherein the selective heating is performed using induction heating at a single constant frequency between 5 and 50 kHz to heat the thicker sections to a selected temperature and a single constant power density, wherein the same frequency and the same power density are simultaneously applied to the thicker and thinner sections, and
   cooling the annealed strip,
   the strip to be cut into pieces called tailor rolled blanks,
   wherein the annealing is performed by continuous annealing.

2. Method according to claim 1, wherein during the forming of the strip having a variable thickness in its length direction the thickness reduction after hot rolling of the steel strip is less than 15% for the thicker sections and more than 15% for the thinner sections.

3. Method according to claim 2, wherein the thickness reduction after hot rolling of the steel strip is between 20 and 50% for the thinner sections.

4. Method according to claim 1, wherein the maximum temperature during said continuous annealing is higher than 720° C. to form austenite, and the steel is fully recrystallized during said continuous annealing,
   wherein after said full recrystallisation the steel strip is cooled at a cooling rate between 5 and 150° C./s to produce high strength steel selected from DP, TRIP and multi phase strength steels, and said cooling of the annealed steel transforms the austenite into martensite, bainite and/or retained austenite.

5. Method according to claim 4, wherein the maximum temperature and/or the soaking temperature of the strip of steel during the annealing is kept within a range between 720 and 800° C.

6. Method according to claim 1, wherein thinner sections of the strip of steel have had a thickness reduction between 20 and 50%.

7. Method according to claim 1, wherein thinner sections of the strip of steel receive less heat during the annealing than thicker sections of the strip of steel.

8. Method according to claim 1, wherein the selective heating of the strip of steel is performed during and/or after the heat-up phase of continuous annealing.

9. Method according to claim 1, wherein the annealing comprises heating the steel to a first temperature without selective heating and then selectively heating the steel by induction heating to increase the temperature of the thick section to be equal to or greater than the temperature of the thin section.

10. Method according to claim 1, wherein the induction heating is performed with a power density of 1000 kW/m² or more.

11. Method according to claim 10, wherein the heating of the strip during the annealing is performed at a velocity such that the temperature of the thicker sections remains under the recrystallisation temperature of the thicker sections and the temperature of the thinner sections is raised to a temperature above the recrystallisation temperature of the thinner sections.

12. Method according to claim 1, wherein the annealing is performed to produce high strength steels selected from the group consisting of DP, TRIP and multi-phase high-strength steels.

13. Method according to claim 1, wherein the strip of steel is hot dip galvanised after the continuous annealing.

14. Method according to claim 1, wherein the strip of steel is temper rolled after the continuous annealing.

15. Method according to claim 1, wherein the maximum temperature and/or the soaking temperature of the strip of steel during the annealing is kept within a range with a width of 50° C.

16. Method according to claim 1, wherein the maximum temperature and/or the soaking temperature of the strip of steel during the annealing is kept within a range with a width of 25° C.

17. Method according to claim 1, wherein the induction heating is performed with a frequency between 10 and 30 kHz.

18. The method according to claim 1, further comprising:
   forming the strip by hot rolling;
   cold rolling the strip after hot rolling to form the variable thickness in its length direction with at least thicker and thinner sections, one thicker and one thinner section having length of at most two meters, such that the strip has the repetitive thickness variation;
   cutting the strip into the pieces called tailor rolled blanks.

19. A method comprising:
   annealing a strip of steel,
   the strip of steel having a variable thickness in its length direction with at least thicker sections having a length of at most two meters and thinner sections having a length of at most two meters, such that the strip has a repetitive thickness variation, wherein the strip has been cold rolled to form the thicker and thinner sections,
   wherein the maximum temperature and/or the soaking temperature of the strip of steel during the annealing is kept within a range with a width of 100° C.,
   wherein thicker and thinner sections of the strip of steel are selectively heated to anneal the strip of steel and recrystallize the thinner sections,
   wherein the selective heating is performed using induction heating at a single constant frequency between 5 and 50 kHz to heat the thicker sections to a selected temperature and a single constant power density, wherein the same frequency and the same power density are simultaneously applied to the thicker and thinner sections,
   wherein the annealed strip is cooled,
   wherein the annealing is performed by continuous annealing,
   wherein the heating of the strip during the annealing is performed at a velocity such that the temperature of the thicker sections remains under the recrystallisation temperature of the thicker sections and the temperature of the thinner sections is raised to a temperature above the recrystallisation temperature of the thinner sections,
   the strip to be cut into pieces called tailor rolled blanks.

20. Method according to claim 19, wherein during the forming of the strip having a variable thickness in its length direction the thickness reduction after hot rolling of the steel strip is less than 15% for the thicker sections and more than 15% for the thinner sections.

21. Method according to claim 20, wherein the thickness reduction after hot rolling of the steel strip is between 20 and 50% for the thinner sections.

* * * * *